(12) United States Patent
Kobayashi et al.

(10) Patent No.: US 11,566,534 B2
(45) Date of Patent: Jan. 31, 2023

(54) ROD ASSEMBLY AND TURBOCHARGER (71) Applicant: IHI Corporation, Koto-ku (JP)

(72) Inventors: Yuuji Kobayashi, Koto-ku (JP);
Yasushi Asada, Koto-ku (JP);
Fumihiko Fukuhara, Koto-ku (JP);
Shun Fukuoka, Koto-ku (JP)

(73) Assignee: IHI Corporation, Koto-ku (JP)

( * ) Notice: Subject to any disclaimer, the term of this patent is extended or adjusted under 35 U.S.C. 154(b) by 744 days.

(21) Appl. No.: 16/476,476

(22) PCT Filed: Mar. 9, 2018

(86) PCT No.: PCT/JP2018/009324
§ 371 (c)(1),
(2) Date: Jul. 8, 2019

(87) PCT Pub. No.: WO2018/168716
PCT Pub. Date: Sep. 20, 2018

(65) Prior Publication Data
US 2020/0025021 A1    Jan. 23, 2020

(30) Foreign Application Priority Data

Mar. 17, 2017    (JP) .............................. JP2017-053405

(51) Int. Cl.
*F01D 17/10* (2006.01)
*F16B 7/06* (2006.01)
(Continued)

(52) U.S. Cl.
CPC ................ *F01D 17/10* (2013.01); *F16B 7/06* (2013.01); *F02B 37/00* (2013.01); *F04D 25/04* (2013.01); *F05D 2220/40* (2013.01)

(58) Field of Classification Search
CPC .......... F01D 17/10; F01D 17/165; F16B 7/06; F05D 2220/40; F05D 2230/232;
(Continued)

(56) References Cited

U.S. PATENT DOCUMENTS

| 3,659,834 A  * | 5/1972 | Suozzo ................. F16L 3/2053 |
| | | 267/70 |
| 2014/0037433 A1* | 2/2014 | Hadas ................... F02B 37/186 |
| | | 219/121.64 |
| 2015/0132044 A1* | 5/2015 | Tylaska ................... F16G 11/02 |
| | | 403/46 |

FOREIGN PATENT DOCUMENTS

| JP | 58-162726 A | 9/1983 |
| JP | 59-153920 A | 9/1984 |

(Continued)

OTHER PUBLICATIONS

International Search Report dated May 1, 2018 in PCT/JP2018/009324, 1 page.

*Primary Examiner* — J. Todd Newton
(74) *Attorney, Agent, or Firm* — Oblon, McClelland, Maier & Neustadt, L.L.P.

(57) ABSTRACT

A rod assembly includes a turnbuckle that extends along a central axis, a first rod that is to be screwed into a first adjustment hole of the turnbuckle, a second rod that is to be screwed into a second adjustment hole of the turnbuckle, a first nut that is fitted to a first adjustment end portion of the first rod, and a second nut that is fitted to a second adjustment end portion of the second rod. A first turnbuckle-welded portion is provided between the first nut and the turnbuckle, and a second turnbuckle-welded portion is provided between the second nut and the turnbuckle. A first rod-welded portion is provided between the first nut and the
(Continued)

first rod, and a second rod-welded portion is provided between the second nut and the second rod.

7 Claims, 6 Drawing Sheets

(51) Int. Cl.
*F04D 25/04* (2006.01)
*F02B 37/00* (2006.01)

(58) Field of Classification Search
CPC ........... F05D 2230/644; F05D 2260/56; F16C 11/04; F02B 37/18
USPC .......................................................... 403/44
See application file for complete search history.

(56) References Cited

FOREIGN PATENT DOCUMENTS

| | | | |
|---|---|---|---|
| JP | 2583721 | Y2 | 10/1998 |
| JP | 11-315816 | A | 11/1999 |
| JP | 2004-286103 | A | 10/2004 |
| JP | 3583616 | B2 | 11/2004 |
| JP | 2005-133404 | A | 5/2005 |
| JP | 3111339 | U | 7/2005 |
| JP | 2012017667 | A * | 1/2012 |
| JP | 2014-181589 | A | 9/2014 |

\* cited by examiner

ROD ASSEMBLY AND TURBOCHARGER

TECHNICAL FIELD

The present disclosure relates to a rod assembly including a turnbuckle and a turbocharger including the rod assembly.

BACKGROUND ART

Rods, which are provided in a turbocharger and of which the lengths can be adjusted as disclosed in Patent Documents 1 and 2, are known. The rod disclosed in Patent Document 1 is used for an actuator for a waste gate valve and includes an adjuster used to adjust the length of the rod. The rod disclosed in Patent Document 2 is also used for an actuator for a waste gate valve and includes a connecting rod and an adjustment rod. The connecting rod is inserted into a threaded hole of the adjustment rod. This rod includes a lock nut that locks the adjusted positions of these rods and a cylindrical protective sleeve that covers the lock nut. Since the lock nut is fixed at a predetermined position, the lock nut is adapted so that the lock nut cannot easily readjust the rods.

CITATION LIST

Patent Literature

Patent Document 1: Japanese Unexamined Patent Publication No. S59-153920
Patent Document 2: Japanese Unexamined Patent Publication No. S58-162726

SUMMARY OF INVENTION

Technical Problem

Since a rod assembly includes a turnbuckle, the length of the rod assembly can be adjusted. For example, the length of the rod assembly can be adjusted for the adjustment of the characteristics of an actuator provided in a variable capacity mechanism of a turbocharger. That is, a user can adjust performance or exhaust gas characteristics by adjusting the length of the rod assembly. For example, there is a concern that a person other than a builder may readjust the length of the rod assembly (or do mischief) after the builder adjusts the length of the rod assembly. Since the protective sleeve is required for the rod disclosed in Patent Document 2, the number of components is increased. For this reason, the structure of the rod is complicated.

The present disclosure describes a rod assembly and a turbocharger that are adapted not to enable the length of the rod assembly adjusted once to be readjusted with a simple structure.

Solution to Problem

A rod assembly according to an aspect of the present disclosure includes: a turnbuckle that extends along a central axis and includes a first adjustment hole, which extends along the central axis and is provided at a first end portion and in which a female thread is formed, and a second adjustment hole, which extends along the central axis and is provided at a second end portion and in which a female thread is formed; a first rod that is disposed along the central axis and includes a first adjustment end portion on which a male thread is formed and which is to be screwed into the first adjustment hole of the turnbuckle and a first connecting end portion which is provided on a side opposite to the first adjustment end portion and is to be connected to an external first member; a second rod that is disposed along the central axis and includes a second adjustment end portion on which a male thread is formed and which is to be screwed into the second adjustment hole of the turnbuckle and a second connecting end portion which is provided on a side opposite to the second adjustment end portion and is to be connected to an external second member; a first nut that is fitted to the first adjustment end portion of the first rod and is in contact with a first end face of the first end portion of the turnbuckle; and a second nut that is fitted to the second adjustment end portion of the second rod and is in contact with a second end face of the second end portion of the turnbuckle. A first turnbuckle-welded portion is provided between the first nut and the first end portion of the turnbuckle and a second turnbuckle-welded portion is provided between the second nut and the second end portion of the turnbuckle, and a first rod-welded portion is provided between the first nut and the first rod and a second rod-welded portion is provided between the second nut and the second rod.

Effects of Invention

An aspect of the present disclosure is adapted not to enable the length of a rod assembly to be readjusted with a simple structure. There is provided a highly reliable turbocharger which is adapted so that the length of a rod assembly adjusted once cannot be readjusted.

DESCRIPTION OF EMBODIMENTS

A rod assembly according to an aspect of the present disclosure includes: a turnbuckle that extends along a central axis and includes a first adjustment hole, which extends along the central axis and is provided at a first end portion and in which a female thread is formed, and a second adjustment hole, which extends along the central axis and is provided at a second end portion and in which a female thread is formed; a first rod that is disposed along the central axis and includes a first adjustment end portion on which a male thread is formed and which is to be screwed into the first adjustment hole of the turnbuckle and a first connecting end portion which is provided on a side opposite to the first adjustment end portion and is to be connected to an external first member; a second rod that is disposed along the central axis and includes a second adjustment end portion on which a male thread is formed and which is to be screwed into the second adjustment hole of the turnbuckle and a second connecting end portion which is provided on a side opposite to the second adjustment end portion and is to be connected to an external second member; a first nut that is fitted to the first adjustment end portion of the first rod and is in contact with a first end face of the first end portion of the turnbuckle; and a second nut that is fitted to the second adjustment end portion of the second rod and is in contact with a second end face of the second end portion of the turnbuckle. A first turnbuckle-welded portion is provided between the first nut and the first end portion of the turnbuckle and a second turnbuckle-welded portion is provided between the second nut and the second end portion of the turnbuckle, and a first rod-welded portion is provided between the first nut and the first rod and a second rod-welded portion is provided between the second nut and the second rod.

In this rod assembly, the first rod is screwed into the first end portion of the turnbuckle and the second rod is screwed into the second end portion. When the turnbuckle is rotated with respect to the first and second rods, the length of the entire rod assembly is changed. After the length of the rod assembly is adjusted to a certain length, the respective members are fixed by the first and second nuts. Accordingly, a length where the external first and second members are connected to each other is adjusted. The first turnbuckle-welded portion is provided between the first nut and the first end portion of the turnbuckle, and the second turnbuckle-welded portion is provided between the second nut and the second end portion of the turnbuckle. In addition, the first and second turnbuckle-welded portions are provided between the first and second nuts. According to the rod assembly, since the respective members are fixed to each other by welding, the turnbuckle cannot be rotated with respect to the first and second rods anymore. Therefore, the length of the rod assembly is adapted not to be capable of being readjusted with a simple structure where the welded portions are provided without an increase in the number of components. For example, after a builder adjusts the length of the rod assembly, a situation where a person other than the builder readjusts the length of the rod assembly (or does mischief) can be prevented.

In some aspects, each of the first and second turnbuckle-welded portions is provided in an angular range of 90° to 180° around the central axis. According to this structure, an attempt to forcibly remove welding by rotating the first rod or the second rod can cause the fracture of the first rod or the second rod. Accordingly, since an attempt to readjust the length of the rod assembly can be made to fail, an effect of preventing mischief is obtained.

In some aspects, at least one of the first and second connecting end portions is provided with a connecting pin having a connection axis orthogonal to the central axis, and each of the first and second turnbuckle-welded portions is provided on one side of a virtual plane including the central axis and the connection axis. In this case, the first and second turnbuckle-welded portions are provided on surfaces facing in a direction perpendicular to the axis of the pin, that is, on side surfaces. Even though deformation caused by welding occurs, deformation (the bending of the entire rod assembly or the like) occurs in a plane perpendicular to the axis of the pin. Accordingly, the direction of the axis of the pin is likely to be maintained. This structure relating to welding can connect the rod assembly to the external first or second member through the pin without hindrance.

In some aspects, the first and second turnbuckle-welded portions are provided on opposite sides of the central axis. In this case, even though deformation caused by welding occurs at the first and second end portions of the turnbuckle, the first and second rods can be deformed on the opposite sides of the central axis. Accordingly, the first and second rods are likely to be maintained in parallel. This structure relating to welding can connect the rod assembly to the external first and second members without hindrance.

In some aspects, the first and second rod-welded portions are provided on opposite sides of the central axis. In this case, even though deformation caused by welding occurs at the first and second rods, the first and second rods can be deformed on the opposite sides of the central axis. Accordingly, the first and second rods are likely to be maintained in parallel. This structure relating to welding can connect the rod assembly to the external first and second members without hindrance.

A turbocharger including a variable capacity mechanism, which includes the rod assembly according to any one of the above-mentioned aspects, can be provided as another aspect of the present disclosure. According to this turbocharger, since the length of the rod assembly is adapted not to be capable of being readjusted, an effect of preventing mischief is obtained. The length of the rod assembly is important in terms of performance and exhaust gas characteristics in the variable capacity mechanism. A turbocharger, which is adapted so that the length of the rod assembly adjusted once cannot be readjusted, has high reliability.

Embodiments of the present disclosure will be described below with reference to the drawings. Meanwhile, the same elements will be denoted by the same reference numerals in the description of the drawings, and the repeated description thereof will be omitted.

Figure 1:
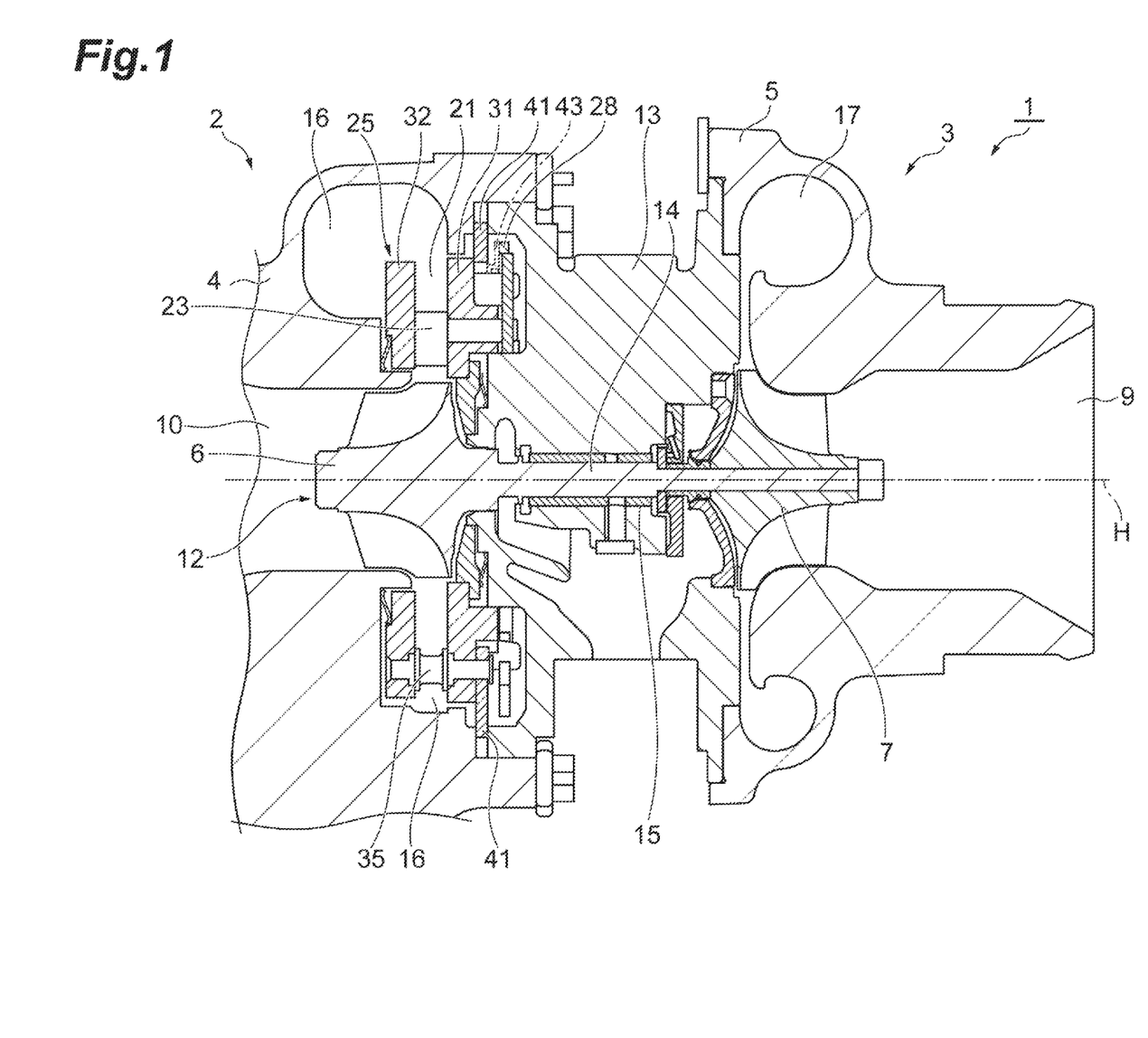
FIG. 1 is a cross-sectional view illustrating a turbocharger according to an embodiment of the present disclosure.

A variable-capacity turbocharger 1 illustrated in FIG. 1 is applied to, for example, internal-combustion engines of a ship and a vehicle. As illustrated in FIG. 1, the variable-capacity turbocharger 1 includes a turbine 2 and a compressor 3. The turbine 2 includes a turbine housing 4 and a turbine impeller 6 that is housed in the turbine housing 4. The turbine housing 4 includes a scroll flow passage 16 that is provided around the turbine impeller 6 and extends in the circumferential direction. The compressor 3 includes a compressor housing 5 and a compressor impeller 7 that is housed in the compressor housing 5. The compressor housing 5 includes a scroll flow passage 17 that is provided around the compressor impeller 7 and extends in the circumferential direction.

The turbine impeller 6 is provided at one end of a rotating shaft 14, and the compressor impeller 7 is provided at the other end of the rotating shaft 14. A bearing housing 13 is provided between the turbine housing 4 and the compressor housing 5. The rotating shaft 14 is rotatably supported through a bearing 15 by the bearing housing 13, and the rotating shaft 14, the turbine impeller 6, and the compressor impeller 7 are rotated about a rotation axis H as an integrated rotating body 12.

The turbine housing 4 is provided with an exhaust gas inlet 8 (see FIG. 2) and an exhaust gas outlet 10. Exhaust gas discharged from an internal-combustion engine (not illustrated) flows into the turbine housing 4 through the exhaust gas inlet, flows to the turbine impeller 6 through the scroll flow passage 16, and rotates the turbine impeller 6. After that, the exhaust gas flows out of the turbine housing 4 through the exhaust gas outlet 10.

The compressor housing 5 is provided with an intake port 9 and a discharge port (not illustrated). When the turbine impeller 6 is rotated as described above, the compressor impeller 7 is rotated through the rotating shaft 14. The compressor impeller 7, which is being rotated, takes in outside air through the intake port 9, compresses the air, and discharges the compressed air from the discharge port through the scroll flow passage 17. The compressed air, which is discharged from the discharge port, is supplied to the above-mentioned internal-combustion engine.

Subsequently, the turbine 2 will be further described. The turbine 2 is a variable-capacity turbine, and a gas inflow passage 21, which connects the scroll flow passage 16 to the turbine impeller 6, is provided with a plurality of variable nozzle blades 23. The plurality of variable nozzle blades 23 are arranged on the circumference of a circle that has a center on the rotation axis H, and each of the variable nozzle blades 23 is rotated around a rotation axis parallel to the rotation axis H. The gas inflow passage 21 allows gas, which flows to the turbine impeller 6 from the scroll flow passage 16, to pass. The variable nozzle blades 23 are rotated as described above, so that the cross-sectional area (throat area) of a gas flow passage is optimally adjusted according to the flow rate of exhaust gas to be introduced into the turbine 2.

The turbine 2 includes a variable nozzle unit (variable capacity mechanism) 25 as a drive mechanism that rotates the variable nozzle blades 23 as described above. The variable nozzle unit 25 includes the plurality of variable nozzle blades 23 and a first nozzle ring 31 and a second nozzle ring 32 between which the variable nozzle blades 23 are interposed in the direction of the axis.

An annular disc-shaped support ring 41 is fixed to the side of the first nozzle ring 31 facing the compressor, and a ring-shaped drive ring support member 43 is fixed to the side of the support ring 41 facing the compressor. The first nozzle ring 31, the second nozzle ring 32, the support ring 41, and the drive ring support member 43 are connected to each other by connecting pins 35. A drive ring 28 is mounted on the drive ring support member 43, so that the drive ring 28 is supported to be rotatable around the rotation axis H.

Figure 2:
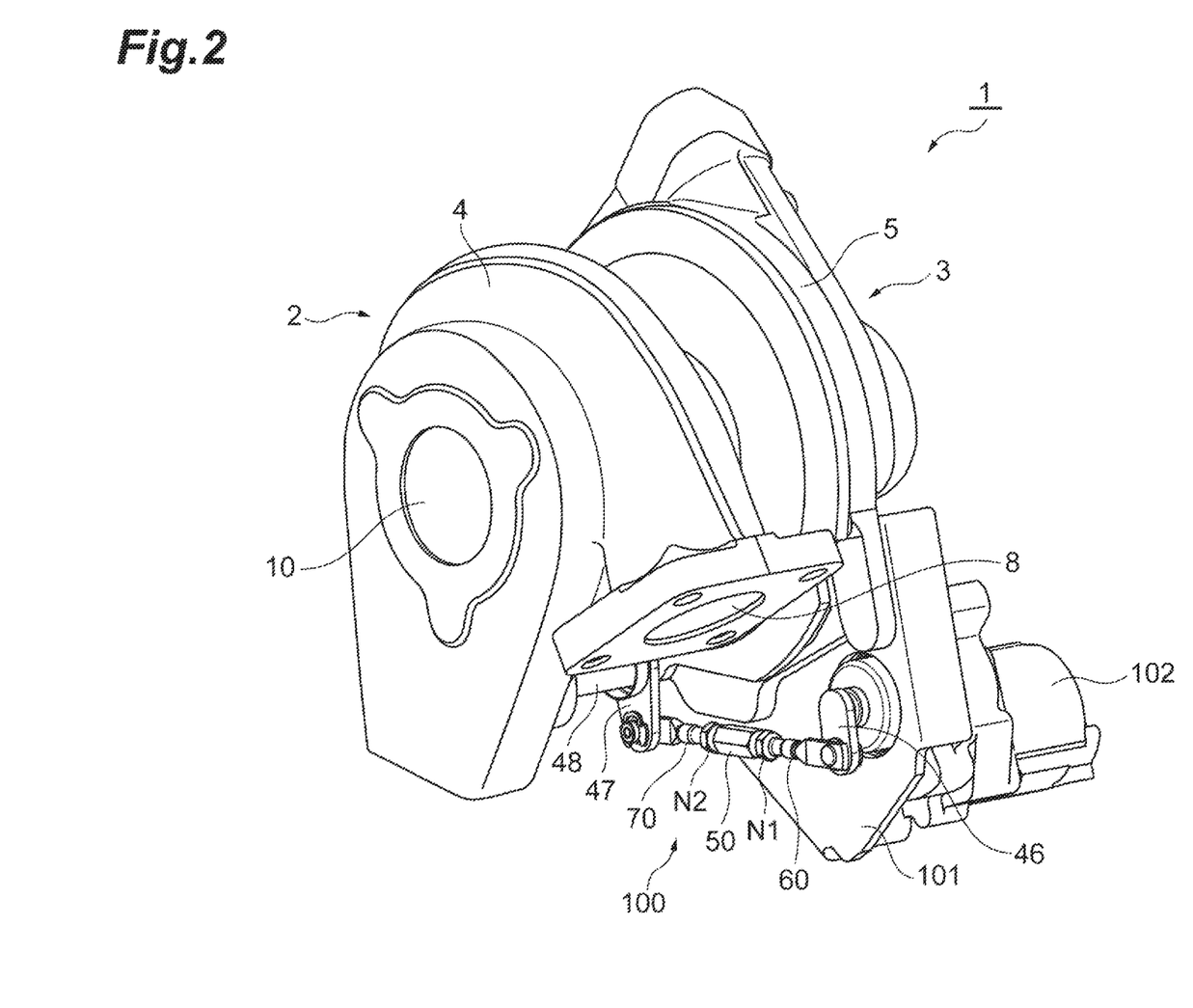
FIG. 2 is a perspective view illustrating the turbocharger of FIG. 1.

Subsequently, the drive mechanism of the variable nozzle unit 25 will be described with reference to FIG. 2. As illustrated in FIG. 2, a motor 102 and a rod assembly 100 are provided outside the turbine housing 4 and the compressor housing 5 as the drive mechanism of the variable nozzle unit 25. The motor 102 is fixed to a bracket 101 mounted on the compressor 3. An output shaft of the motor 102 is connected to the drive ring 28 provided in the turbine housing 4 through a first link member 46, the rod assembly 100, a second link member 47, and a drive shaft 48. When a driving force generated from the motor 102 is input to the drive ring 28, the drive ring 28 is rotated around the rotation axis H. Accordingly, the respective variable nozzle blades 23 are rotated. Meanwhile, a driving source is not limited to the motor 102. The driving source may be, for example, a pneumatic actuator including a diaphragm.

The length of the rod assembly 100 is adjusted in advance by a builder so that the variable nozzle blades 23 are rotated by a predetermined angle according to the rotation angle of the output shaft of the motor 102. The rotation angle of each of the variable nozzle blades 23 is important in terms of the performance and exhaust gas characteristics of the turbine 2. The length of the rod assembly 100 is adapted not to be capable of being readjusted with a simple structure of the rod assembly 100. That is, the rod assembly 100 is adapted so that the readjustment of the length of the rod assembly 100 ends in failure even though somebody other than a builder tries readjusting the length of the rod assembly 100 for the purpose of a mischief or the like. The rod assembly 100 is a (tamper resistant) rod with a so-called mischief-prevention function.

The rod assembly 100 will be described in detail with reference to FIG. 3. The rod assembly 100 has a central axis A. The rod assembly 100 includes a turnbuckle 50 that extends along the central axis A and a first rod 60 and a second rod 70 that are provided on both sides of the turnbuckle 50 along the central axis A.

The turnbuckle 50 has a cylindrical shape. A first adjustment hole 51b, which extends along the central axis A, is provided at a first end portion 51 of the turnbuckle 50 facing the first rod 60. A second adjustment hole 52b, which extends along the central axis A, is provided at a second end portion 52 of the turnbuckle 50 facing the second rod 70. For example, the first and second adjustment holes 51b and 52b communicate with each other and pass though the turnbuckle 50 in the direction of the central axis A. A female thread is formed in each of the first and second adjustment holes 51b and 52b. One female thread is a right-hand thread, and the other female thread is a left-hand thread. The material of the turnbuckle 50 is not particularly limited. Publicly known metal materials can be used.

An intermediate portion 53 is provided between the first and second end portions 51 and 52. The appearance of the intermediate portion 53 has, for example, the shape of a hexagonal prism. The intermediate portion 53 is adapted to be capable of being rotated about the central axis A by a rotating tool, such as a wrench.

The first rod 60 is disposed close to the motor 102 (see FIG. 2). The first rod 60 is disposed along the central axis A. The first rod 60 includes a first adjustment end portion 65 that is to be screwed into the first end portion 51 of the turnbuckle 50, and a first connecting end portion 63 that is provided on a side opposite to the first adjustment end portion 65 and is to be connected to the first link member 46 (an external first member). A male thread, which corresponds to the female thread formed in the first adjustment hole 51b, is formed on the first adjustment end portion 65. The first connecting end portion 63 is provided with a first pin 91 that has a first connection axis L1 orthogonal to the central axis A. The first pin 91 is a connecting pin for the driving source, and is inserted into a through-hole formed at the first link member 46.

The second rod 70 is disposed close to the drive shaft 48 (see FIG. 2). The second rod 70 is disposed along the central axis A. The second rod 70 includes a second adjustment end portion 75 that is to be screwed into the second end portion 52 of the turnbuckle 50, and a second connecting end portion 73 that is provided on a side opposite to the second adjustment end portion 75 and is to be connected to the second link member 47 (an external second member). A male thread, which corresponds to the female thread formed in the second adjustment hole 52b, is formed on the second adjustment end portion 75. The second connecting end portion 73 is provided with a second pin 92 that has a second connection axis L2 orthogonal to the central axis A. The second pin 92 is a connecting pin for the drive ring 28, and is inserted into a through-hole formed at the second link member 47.

In the rod assembly 100, the first and second pins 91 and 92 stand on opposite sides of the central axis A for the convenience of the layout of the motor 102. The first connection axis L1 of the first pin 91 and the second connection axis L2 of the second pin 92 are substantially parallel to each other.

A first nut N1 is fitted to the first adjustment end portion 65 of the first rod 60. The first nut N1, which is to be engaged with the male thread of the first adjustment end portion 65, is tightened until being in contact with a first end face 51a of the first end portion 51 after the adjustment of the length of the rod assembly 100. On the other hand, a second nut N2 is fitted to the second adjustment end portion 75 of the second rod 70. The second nut N2, which is to be engaged with the male thread of the second adjustment end portion 75, is tightened until being in contact with a second end face 52a of the second end portion 52 after the adjustment of the length of the rod assembly 100. In this way, the length of the entire rod assembly 100 is maintained constant.

For the mischief-prevention function, welded portions are provided at four positions on the rod assembly 100. A first turnbuckle-welded portion 81 is provided between the first nut N1 and the first end portion 51 of the turnbuckle 50. First rod-welded portions 83 are provided between the first nut N1 and the first adjustment end portion 65 of the first rod 60. A second turnbuckle-welded portion 82 is provided between the second nut N2 and the second end portion 52 of the turnbuckle 50. Second rod-welded portions 84 are provided between the second nut N2 and the second adjustment end portion 75 of the second rod 70.

Figure 3:
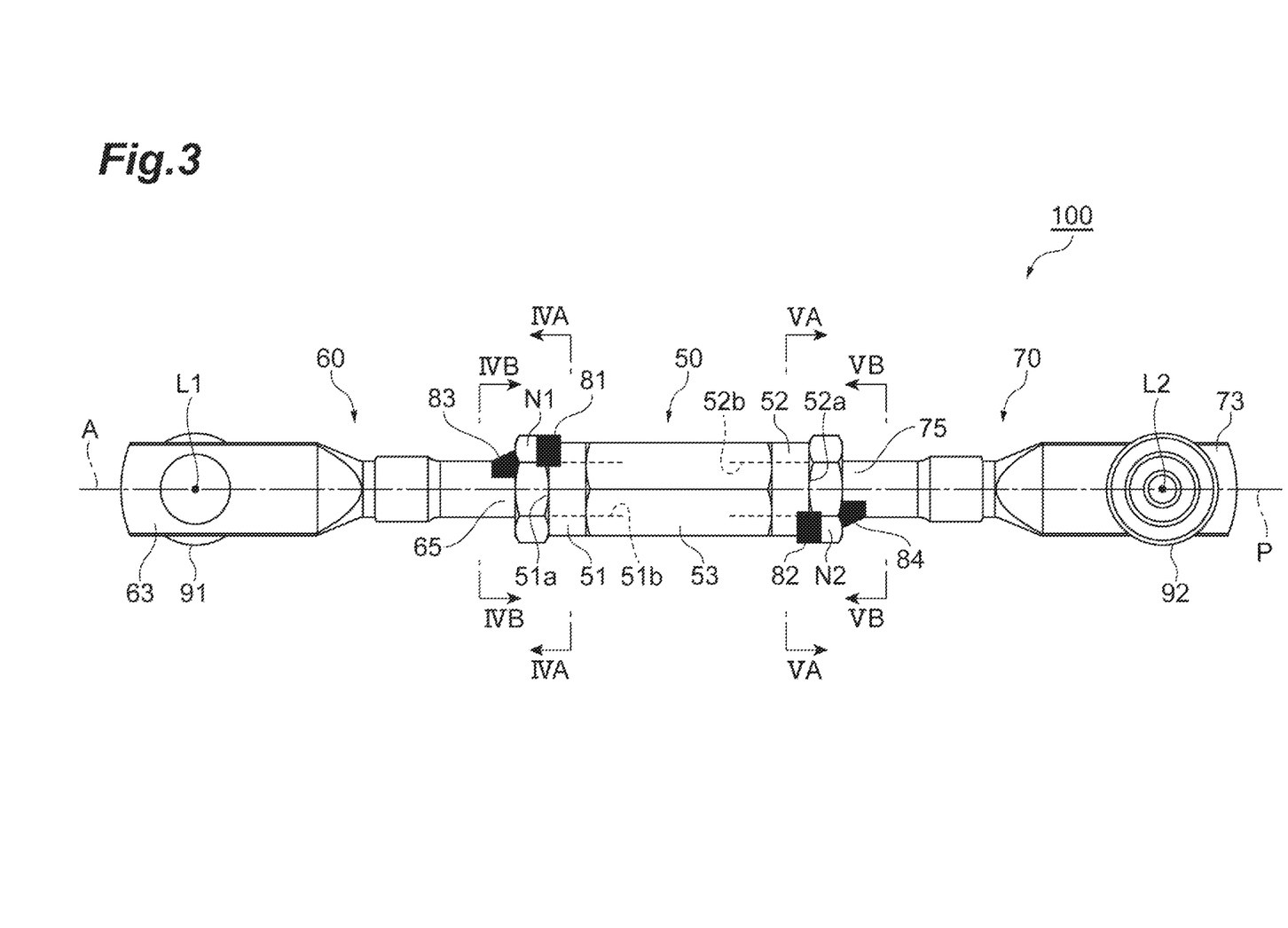
FIG. 3 is a diagram illustrating a rod assembly of FIG. 2.
Figure 4A:
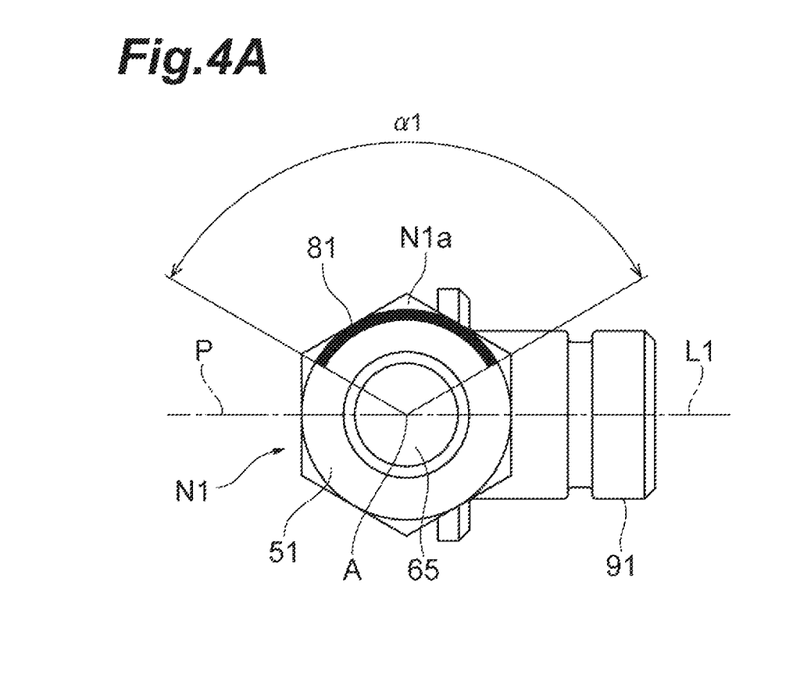
FIG. 4A is a cross-sectional view taken along line IVA-IVA of FIG. 3.
Figure 5A:
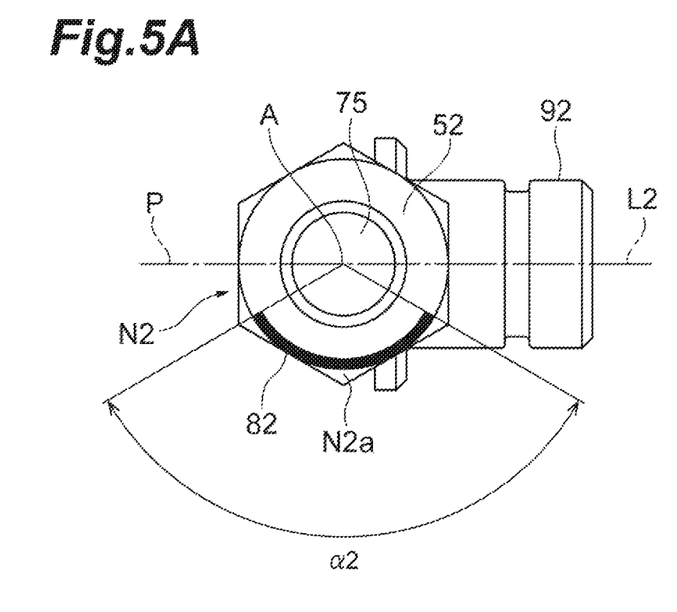
FIG. 5A is a cross-sectional view taken along line VA-VA of FIG. 3.

As illustrated in FIGS. 3, 4A, and 5A, the first turnbuckle-welded portion 81 is provided on one side of a virtual plane P that includes the central axis A and the first connection axis L1. The second turnbuckle-welded portion 82 is provided on one side of a virtual plane P that includes the central axis A and the second connection axis L2. That is, both the first and second turnbuckle-welded portions 81 and 82 are formed on the side surfaces of the turnbuckle 50 (that is, on the lateral sides of the first and second pins 91 and 92).

In more detail, the first and second turnbuckle-welded portions 81 and 82 are provided on the opposite sides of the central axis A.

As illustrated in FIG. 4A, the first turnbuckle-welded portion 81 is provided between the first end portion 51 and an end face N1a of the first nut N1 facing the turnbuckle in an angular range α1 around the central axis A. For example, the first turnbuckle-welded portion 81 is provided continuously (in the shape of an arc) over the angular range α1. The welded portion is not present in a range except for the angular range α1. The first turnbuckle-welded portion 81 can be formed by, for example, TIG welding or laser welding.

The angular range α1 of the first turnbuckle-welded portion 81 may be 120°. The angular range α1 may be the range of 90° to 180°. When the angular range α1 is properly set, a force to fracture the first adjustment end portion 65 or a force to crush the thread of the first nut N1 acts in a case where the first nut N1 and the first end portion 51 are to be rotated while being grasped.

As illustrated in FIG. 5A, the second turnbuckle-welded portion 82 is provided between the second end portion 52 and an end face N2a of the second nut N2 facing the turnbuckle in an angular range α2 around the central axis A. For example, the second turnbuckle-welded portion 82 is provided continuously (in the shape of an arc) over the angular range α2. The welded portion is not present in a range except for the angular range α2. The second turnbuckle-welded portion 82 can be formed by, for example, TIG welding or laser welding.

The angular range α2 of the second turnbuckle-welded portion 82 may be 120°. The angular range α2 may be the range of 90° to 180°. When the angular range α2 is properly set, a force to fracture the second adjustment end portion 75 or a force to crush the thread of the second nut N2 acts in a case where the second nut N2 and the second end portion 52 are to be rotated while being grasped.

Figure 4B:
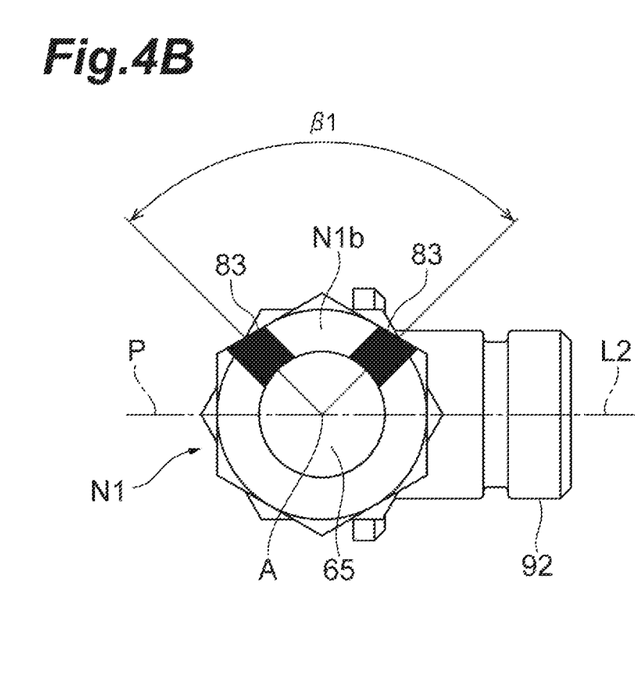
FIG. 4B is a cross-sectional view taken along line IVB-IVB of FIG. 3.
Figure 5B:
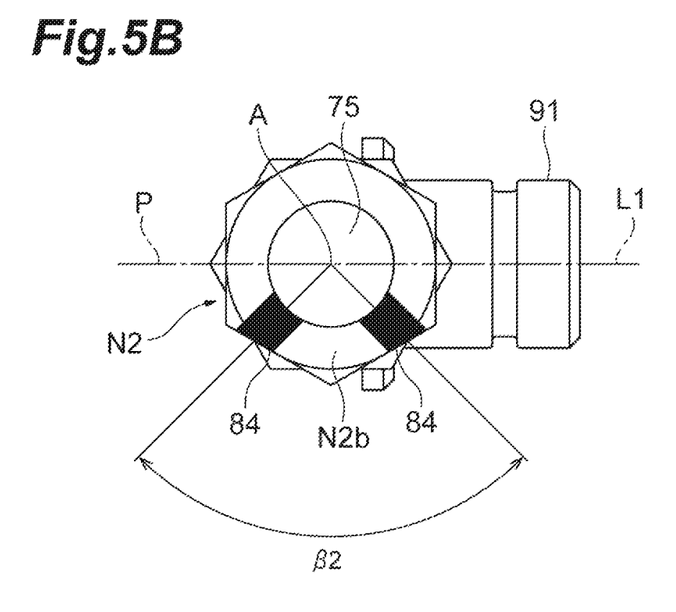
FIG. 5B is a cross-sectional view taken along line VB-VB of FIG. 3.

As illustrated in FIGS. 3, 4B, and 5B, the first rod-welded portions 83 are provided on one side of the virtual plane P that includes the central axis A and the first connection axis L1. The second rod-welded portions 84 are provided on one side of the virtual plane P that includes the central axis A and the second connection axis L2. That is, both the first and second rod-welded portions 83 and 84 are formed on the side surfaces of the turnbuckle 50 (that is, on the lateral sides of the first and second pins 91 and 92).

In more detail, the first and second rod-welded portions 83 and 84 are provided on the opposite sides of the central axis A. The first rod-welded portions 83 and the first turnbuckle-welded portion 81 may be provided on the same side of the virtual plane P. The second rod-welded portions 84 and the second turnbuckle-welded portion 82 may be provided on the same side of the virtual plane P.

As illustrated in FIG. 4B, the first rod-welded portions 83 are provided between the first adjustment end portion 65 and an end face N1b of the first nut N1 facing the rod at two points spaced apart from each other by an angle β1 around the central axis A. For example, the first rod-welded portions 83 are intermittently provided in the range of the angle β1. The welded portion is not present at positions except for the two positions. The first rod-welded portions 83 can be formed by, for example, TIG welding using a filler rod.

The angle β1 where the first rod-welded portions 83 are provided may be 90°. The angle β1 may be in the range of 60° to 120°. The first rod-welded portions 83 may be provided at three or more positions. When the angle β1 is properly set, a force to fracture the first adjustment end portion 65 acts (for example, on a portion of the male thread) in a case where the first nut N1 and the first adjustment end portion 65 are to be rotated while being grasped.

As illustrated in FIG. 5B, the second rod-welded portions 84 are provided between the second adjustment end portion 75 and an end face N2b of the second nut N2 facing the rod at two points spaced apart from each other by an angle β2 around the central axis A. For example, the second rod-welded portions 84 are intermittently provided in the range of the angle β2. The welded portion is not present at positions except for the two positions. The second rod-welded portions 84 can be formed by, for example, TIG welding using a filler rod.

The angle β2 where the second rod-welded portions 84 are provided may be 90°. The angle β2 may be in the range of 60° to 120°. The second rod-welded portions 84 may be provided at three or more positions. When the angle β2 is properly set, a force to fracture the second adjustment end portion 75 acts (for example, on a portion of the male thread) in a case where the second nut N2 and the second adjustment end portion 75 are to be rotated while being grasped.

Meanwhile, various methods publicly known can be used as a welding method for the respective welded portions having been described above. Laser welding can be applied to a portion of which the deterioration of the strength of a material caused by sputtering or the input of heat is desired be suppressed. The material of each of the first rod 60, the second rod 70, the first nut N1, and the second nut N2 is not particularly limited. Publicly known metal materials can be used.

In the rod assembly 100 of this embodiment, the first rod 60 is screwed into the first end portion 51 of the turnbuckle 50 and the second rod 70 is screwed into the second end portion 52. When the turnbuckle 50 is rotated with respect to the first and second rods 60 and 70, the length of the entire rod assembly 100 is changed. Meanwhile, the adjustment of this length can be performed in a state where the first and second pins 91 and 92 are connected to the first and second link members 46 and 47, respectively. After the length of the rod assembly 100 is adjusted to a certain length, the respective members are fixed by the first and second nuts N1 and N2. Accordingly, a length where the external first and second link members 46 and 47 are connected to each other is adjusted. The first turnbuckle-welded portion 81 is provided between the first nut N1 and the first end portion 51 of the turnbuckle 50, and the second turnbuckle-welded portion 82 is provided between the second nut N2 and the second end portion 52 of the turnbuckle 50. In addition, the first rod-welded portions 83 are provided between the first nut N1 and the first rod 60, and the second rod-welded portions 84 are provided between the second nut N2 and the second rod 70. According to the rod assembly 100, since the respective members are fixed to each other by welding, the turnbuckle 50 cannot be rotated with respect to the first and second rods 60 and 70 anymore. Accordingly, the length of the rod assembly 100 is adapted not to be capable of being readjusted with a simple structure where the welded portions are provided without an increase in the number of components. For example, after a builder adjusts the length of the rod assembly 100, a situation where a person other than the builder readjusts the length of the rod assembly 100 (or does mischief) is prevented.

Each of the first and second turnbuckle-welded portions 81 and 82 is provided in the angular range of 90° to 180° around the central axis. According to this structure, an attempt to forcibly remove welding by rotating the first rod 60 or the second rod 70 can cause the fracture of the first rod 60 or the second rod 70. Accordingly, since an attempt to readjust the length of the rod assembly can be made to fail, an effect of preventing mischief is obtained.

The first and second turnbuckle-welded portions 81 and 82 are provided on surfaces facing in a direction perpendicular to the first connection axis L1 of the first pin 91 (or the second connection axis L2 of the second pin 92), that is, on side surfaces. Even though deformation caused by welding occurs, deformation (the bending of the entire rod assembly or the like) occurs in a plane perpendicular to the first connection axis L1 of the first pin 91. Accordingly, the direction of the first connection axis L1 of the first pin 91 (or the second connection axis L2 of the second pin 92) is likely to be maintained. This structure relating to welding can connect the rod assembly 100 to the external first and second link members 46 and 47 through the first and second pins 91 and 92 without hindrance.

The first and second turnbuckle-welded portions 81 and 82 are provided on the opposite sides of the central axis A. Even though deformation caused by welding occurs at the first and second end portions 51 and 52 of the turnbuckle 50, the first and second rods 60 and 70 can be deformed on the opposite sides of the central axis A. Accordingly, the first and second rods 60 and 70 are likely to be maintained in parallel. This structure relating to welding can connect the rod assembly 100 to the external first and second link members 46 and 47 without hindrance.

The first and second rod-welded portions 83 and 84 are provided on the opposite sides of the central axis A. Even though deformation caused by welding occurs at the first and second rods 60 and 70, the first and second rods 60 and 70 can be deformed on the opposite sides of the central axis A. Accordingly, the first and second rods 60 and 70 are likely to be maintained in parallel. This structure relating to welding can connect the rod assembly 100 to the external first and second link members 46 and 47 without hindrance.

According to the variable-capacity turbocharger 1, since the length of the rod assembly 100 is adapted not to be capable of being readjusted, an effect of preventing mischief is obtained. The length of the rod assembly 100 is important in terms of performance and exhaust gas characteristics in the variable nozzle unit 25. A turbocharger, which is adapted so that the length of the rod assembly 100 adjusted once cannot be readjusted, has high reliability.

Figure 6:
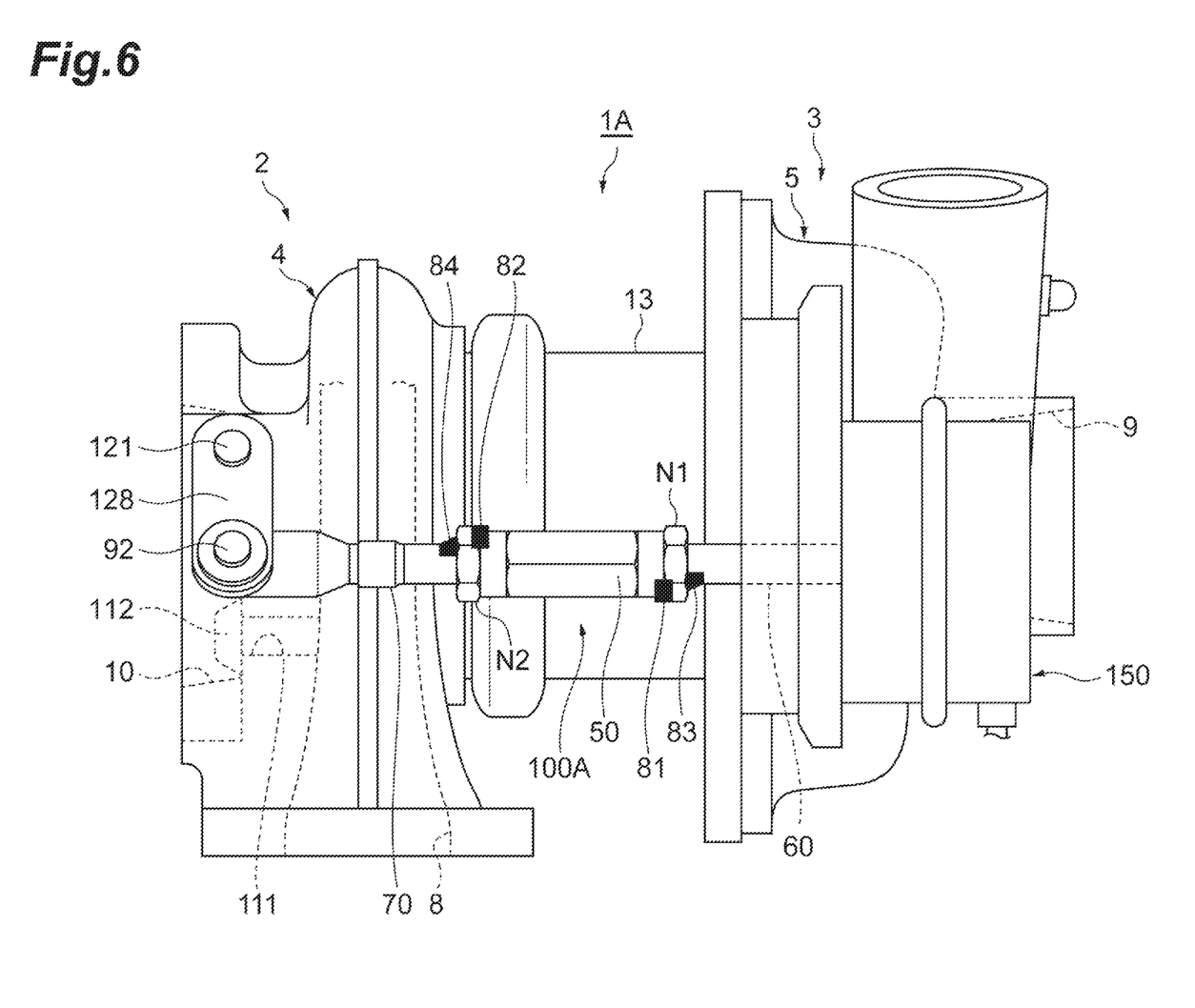
FIG. 6 is a diagram illustrating the appearance of a turbocharger according to another embodiment of the present disclosure.

A variable-capacity turbocharger 1A according to another embodiment will be described with reference to FIG. 6. A rod assembly 100A is different from the rod assembly 100 of the embodiment in that a first rod 60 is not provided with a pin and is connected to a pneumatic actuator 150 including a diaphragm. A turbine housing 4 of the variable-capacity turbocharger 1A is provided with a bypass passage 111 that allows an exhaust gas inlet 8 and an exhaust gas outlet 10 to communicate with each other and a valve body 112 that can open and close the opening of the bypass passage 111. That is, the variable-capacity turbocharger 1A includes a waste gate valve mechanism. A second rod 70 of the rod assembly 100A is connected to the valve body 112 through a second pin 92, a link member 128, a stein 121, and other members (a valve mounting plate and the like). The same actions and effects as those of the variable-capacity turbocharger 1 can be obtained even in this variable-capacity turbocharger 1A.

The embodiments of the present disclosure have been described above, but the invention is not limited to the embodiments. A rod assembly of which two pins protrude in the same direction may be applied to the variable-capacity turbocharger 1 or the variable-capacity turbocharger 1A. A rod assembly of which one pin is omitted may be applied to the variable-capacity turbocharger 1. A rod assembly of which two pins protrude in opposite directions or a rod assembly of which two pins protrude in the same direction may be applied to the variable-capacity turbocharger 1A. A rod assembly not including pins may be provided.

The angular range α1 and/or the angular range α2 may be 180° or more. The first turnbuckle-welded portion 81 and/or the second turnbuckle-welded portion 82 may overlap with the virtual plane P.

INDUSTRIAL APPLICABILITY

Some aspects of the present disclosure are adapted not to enable the length of a rod assembly to be readjusted with a simple structure. There is provided a highly reliable turbocharger which is adapted so that the length of the rod assembly 100 adjusted once cannot be readjusted.

REFERENCE SIGNS LIST 1, 1A: variable-capacity turbocharger, 50: turnbuckle, 51: first end portion, 51a: first end face, 51b: first adjustment hole, 52: second end portion, 52a: second end face, 52b: second adjustment hole, 60: first rod, 63: first connecting end portion, 65: first adjustment end portion, 70: second rod, 73: second connecting end portion, 75: second adjustment end portion, 81: first turnbuckle-welded portion, 82: second turnbuckle-welded portion, 83: first rod-welded portion, 84: second rod-welded portion, 100, 100A: rod assembly, A: central axis, L1: first connection axis, L2: second connection axis, N1: first nut, N2: second nut, α1, α2: angular range, β1, β2: angle.

The invention claimed is:
1. A rod assembly comprising:
a turnbuckle that extends along a central axis, the turnbuckle including a first adjustment hole, which extends along the central axis and is provided at a first end portion and in which a female thread is formed, and a second adjustment hole, which extends along the central axis and is provided at a second end portion and in which a female thread is formed;

a first rod that is disposed along the central axis and includes a first adjustment end portion on which a male thread is formed and which is to be screwed into the first adjustment hole of the turnbuckle and a first connecting end portion which is provided on a side opposite to the first adjustment end portion and is to be connected to an external first member;

a second rod that is disposed along the central axis and includes a second adjustment end portion on which a male thread is formed and which is to be screwed into the second adjustment hole of the turnbuckle and a second connecting end portion which is provided on a side opposite to the second adjustment end portion and is to be connected to an external second member;

a first nut that is fitted to the first adjustment end portion of the first rod and is in contact with a first end face of the first end portion of the turnbuckle; and a second nut that is fitted to the second adjustment end portion of the second rod and is in contact with a second end face of the second end portion of the turnbuckle, wherein a first turnbuckle-welded portion is provided between the first nut and the first end portion of the turnbuckle and a second turnbuckle-welded portion is provided between the second nut and the second end portion of the turnbuckle, a first rod-welded portion is provided between the first nut and the first rod and a second rod-welded portion is provided between the second nut and the second rod, at least one of the first and second connecting end portions is provided with at least one of a first connecting pin and a second connecting pin each having one of a first and second connection axis orthogonal to the central axis, and each of the first and second turnbuckle-welded portions is provided on one side of a virtual plane including the central axis and the connection axis.

2. The rod assembly according to claim 1,
wherein each of the first and second turnbuckle-welded portions is provided in an angular range of 90° to 180° around the central axis.

3. The rod assembly according to claim 1,
wherein the first and second turnbuckle-welded portions are provided on opposite sides of the central axis.

4. The rod assembly according to claim 1,
wherein the first and second rod-welded portions are provided on opposite sides of the central axis.

5. A turbocharger comprising:
a variable nozzle that includes the rod assembly according to claim 1.

6. The rod assembly according to claim 1,
wherein the first connecting end portion is provided with the first connecting pin having the first connection axis orthogonal to the central axis,
the second connecting end portion is provided with the second connecting pin having the second connection axis orthogonal to the central axis,
the first turnbuckle-welded portion is provided on only one side of a first virtual plane including the central axis and the first connection axis, and
the second turnbuckle-welded portion is provided on only one side of a second virtual plane including the central axis and the second connection axis.

7. The rod assembly according to claim 6,
the first turnbuckle-welded portion and the second turnbuckle-welded portion are provided on opposite sides of the central axis.

* * * * *